Aug. 20, 1929.   L. H. BROWN   1,725,391
FLEXIBLE BODY MOUNTING
Filed Feb. 9, 1927
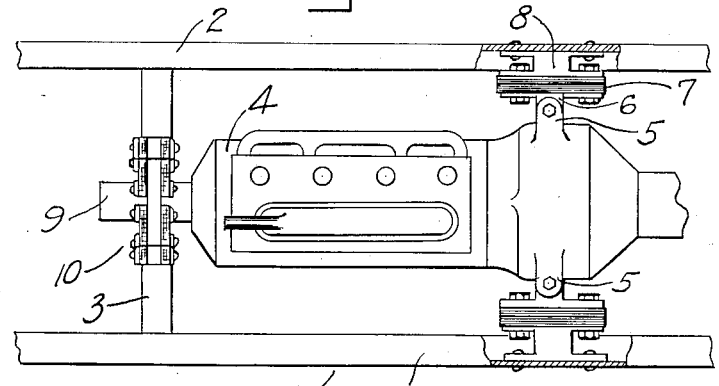
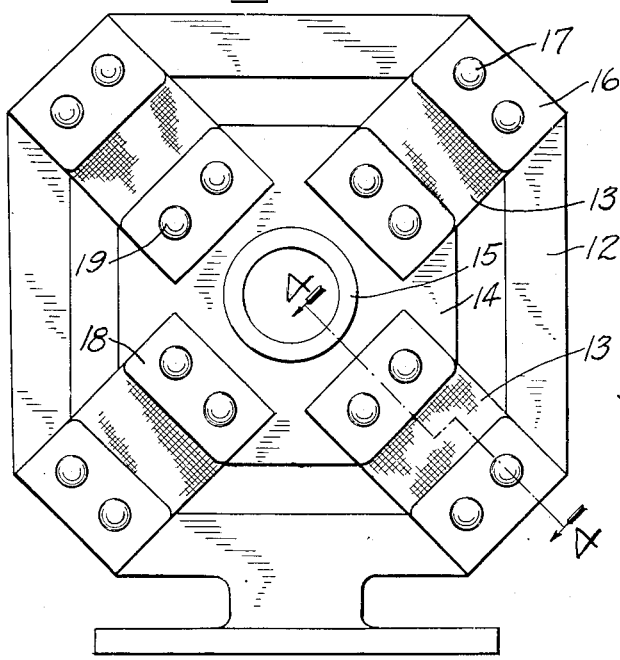
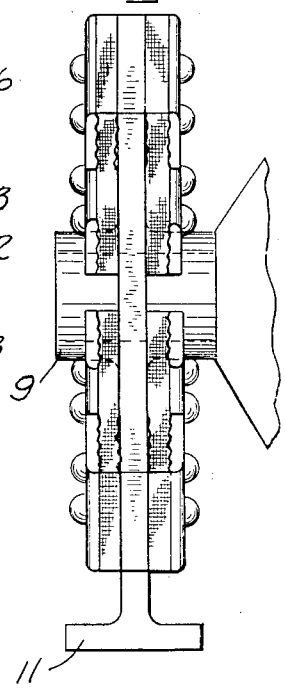
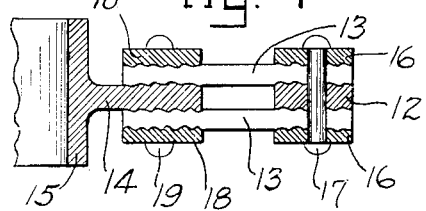
INVENTOR
Lowell H. Brown
BY
ATTORNEY Patented Aug. 20, 1929.

1,725,391

UNITED STATES PATENT OFFICE.

LOWELL H. BROWN, OF NEW YORK, N. Y., ASSIGNOR TO THE BELFLEX CORPORATION, OF NEW YORK, N. Y., A CORPORATION OF DELAWARE.

FLEXIBLE BODY MOUNTING.

Application filed February 9, 1927. Serial No. 166,864.

This invention relates to mountings for vehicle motors and has for its principal object to provide a vehicle motor mounting for preventing extensive or violent movements of the motor with relation to the frame, but constructed to permit vibration of the motor without transmitting such vibrations to the frame.

A more specific object of the invention is to provide a motor mounting comprising a support for limiting bodily movement of the motor in any direction transverse to its axis and capable of absorbing shocks transmitted from the motor in any direction, in combination with opposed supporting means adjacent the opposite end of the motor for resisting driving torque, side sway, and end thrust of the motor.

The invention is applicable in its broader aspects to the mounting of bodies other than vehicle motors.

Other features and advantages will hereinafter appear.

In the drawings forming part of this specification:

Figure 1 is a fragmentary, plan view showing a motor mounted on the frame of a motor vehicle;

Figure 2 is a front elevation of the novel mounting of the present invention, this mounting being used at the front end of the motor in Figure 1;

Figure 3 is a side elevation of the mounting shown in Figure 2 with a fragment of the motor shown associated with it; and Figure 4 is a section on the line 4—4 of Figure 2 looking in the direction of the arrows.

The invention is illustrated as embodied in a motor vehicle having a frame 1 which comprises longitudinal side bars 2 and a transverse connecting bar 3. The motor casing 4 has outreaching arms 5 near its rear end which are connected by any suitable means to the side bars 2 of the vehicle frame. Preferably the oppositely extending arms 5 of the motor casing are connected to the side members of the frame through means of the kind described in the pending application of Harvey W. Bell, Serial No. 131,141, for non-rigid body mountings, filed August 24, 1926, as shown in Figures 1 to 3, for example, of said application. Briefly described, each arm 5 has bolted thereto a clamping bracket 6, the clamping face of which extends vertically, and longitudinally of the vehicle. One or more flexible, inelastic fabric plates 7 are clamped substantially midway of their height to the clamping face of such bracket. The upper and lower ends of the fabric plates are clamped to a clamping bracket 8 which is rigidly secured on one of the side members 2 of the vehicle frame. The supports at the right and left sides of the motor are duplicates.

The present invention has more particularly to do with the mounting means employed at the forward end of the motor casing. A slightly tapering boss or projection 9 on the forward end of the motor casing is secured in a novel support 10, the base 11 of which is rigidly mounted on the cross frame member 3. This support comprises a rigid frame 12 which rises from the base 11 and forms a polygonal collar. Short straps or links 13, preferably of rubberized fabric, extend radially inward from alternate sides of the frame 12 and are connected to a vertical, circumferential flange or body 14 on an inner collar 15 which embraces the tapering boss 9 of the motor casing. The fabric straps 13 are arranged in juxtaposed pairs, the straps of a pair engaging respectively the front and rear faces of the frame 12 and of the flange 14 of collar 15. The outer ends of the straps 13 are clamped to the frame 12 by clamping plates 16 having corrugated inner faces for engagement with the fabric straps, and by securing rivets 17 which extend through both the clamping plates 16, through both fabric straps and through the frame 12. Similarly the inner ends of the fabric straps 13 are clamped to the web 14 by clamping plates 18 and rivets 19. The clamping faces of the frame 12 and of the flange 14 are desirably corrugated to increase the firmness with which they grip the straps 13.

As shown herein, there are four sets of these fabric straps arranged at intervals of ninety degrees around the central boss 9. With this arrangement provision is made for resisting movement of the forward end of the motor in any direction in the plane of the fabric straps. One or more sets of the fabric straps is put under tension by bodily movement of the forward end of the motor in any direction in the plane of the straps.

The straps 13 have no slack and are inelastic. The forward end of the motor is, therefore, held substantially stationary through the cushioning medium of the mounting described, having capacity only for limited vibration. Because of the shock absorbing character of the fabric straps such vibration is not transmitted sharply to the vehicle body.

The particular form of mounting described has been found very efficient in use and very cheap to manufacture. The warp or weft threads of each fabric strap extend radially or substantially so and hence directly oppose any tendency of the motor to move in the direction of the length of such strap. With this disposition of the threads the extent of yielding of the straps can be more accurately predetermined and more narrowly confined than would be the case if the warp and weft threads were obliquely disposed with reference to the direction of the pull upon them.

It is a further point that the fabric is utilized efficiently, and without waste in the mounting described. Straps of the type disclosed can be made from a continuous flat belt of uniform width without any waste of material whatever. This saving of material results in a very substantial saving in the cost of manufacturing these mountings.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be utilized.

I claim:

1. In combination, a vehicle body, a vehicle motor, an open frame rigidly mounted on the vehicle body, a collar rigidly secured to the vehicle motor, and a series of radially disposed, tension fabric straps arranged in a common plane transverse to the motor axis and connecting the frame and collar to resist relative movement of the frame and collar.

2. In combination, a vehicle body, a vehicle motor having a rigid boss or projection thereon, and flexible tension straps radiating from said boss in a common plane transverse to the motor axis and rigidly secured at their outer ends to the body.

3. In combination, a supporting body, a supported body thereon, a series of flexible tension straps radiating from a common point and in a common plane and having their inner ends secured to one of said bodies, and means clamping the outer ends of said tension straps to the other of said bodies.

4. In a motor vehicle, the combination with the motor and body thereof, of means for mounting the motor on the body comprising a series of flexible fabric straps radiating from a common point and in a common plane transverse to the motor axis and having their inner ends secured to the motor and their outer ends secured to the body, said straps being arranged to have threads thereof radially disposed.

5. In a motor vehicle, the combination with the motor and body thereof, of means for mounting the motor on the body comprising flexible, inelastic straps secured to the body and to the motor for bearing the weight of the motor under tension from the body, and additional inelastic, flexible straps connected to the body and to the motor for opposing rebound of the motor with reference to the body, all of said straps being disposed in a common plane.

6. In a motor vehicle, the combination with the motor and the body thereof, of means at opposite sides of the rear end of the motor forming flexible, inelastic, non-metallic, motor supporting connections with the body, and flexible fabric links radiating in a single vertical plane from a common point at the forward end of the motor and secured at their inner and outer ends respectively to the motor and to the vehicle body.

7. In combination, a supporting body, a supported body thereon and a series of flexible tension straps radiating from a common point and in a common plane and having the inner and outer ends thereof rigidly secured respectively to the different bodies, said straps being rectangular in form and having their warp and weft threads extending parallel to their edges.

In testimony whereof I have affixed my signature to this specification.

LOWELL H. BROWN.